(12) United States Patent
Ross

(10) Patent No.: US 9,482,856 B2
(45) Date of Patent: Nov. 1, 2016

(54) SCREENSCOPE

(71) Applicant: Sylvia Inez Ross, Livonia, MI (US)

(72) Inventor: Sylvia Inez Ross, Livonia, MI (US)

(73) Assignee: Sylvia Inez Ross, Livonia, MI (US)

( * ) Notice: Subject to any disclaimer, the term of this patent is extended or adjusted under 35 U.S.C. 154(b) by 0 days.

(21) Appl. No.: 14/487,824

(22) Filed: Sep. 16, 2014

(65) Prior Publication Data

US 2015/0077870 A1 Mar. 19, 2015

Related U.S. Application Data

(60) Provisional application No. 61/878,549, filed on Sep. 16, 2013.

(51) Int. Cl.
*G02B 27/02* (2006.01)
*G02B 25/00* (2006.01)

(52) U.S. Cl.
CPC ........... *G02B 25/002* (2013.01); *G02B 25/007* (2013.01); *G02B 25/008* (2013.01); *G02B 27/02* (2013.01); *G02B 27/022* (2013.01); *G02B 27/025* (2013.01); *G02B 27/027* (2013.01); *G02B 27/028* (2013.01)

(58) Field of Classification Search
CPC G02B 25/002; G02B 25/005; G02B 25/008; G02B 27/00; G02B 27/02; G02B 27/022; G02B 27/027; G02B 27/028
USPC .................. 359/802, 809, 819, 738, 488.01, 359/601–604; 351/45, 200, 246
See application file for complete search history.

(56) References Cited

U.S. PATENT DOCUMENTS

| 4,577,928 | A | * | 3/1986 | Brown | G06F 1/1609 348/834 |
| 4,712,870 | A | * | 12/1987 | Robinson | G06F 1/1609 248/284.1 |
| 5,048,928 | A | * | 9/1991 | Davis | G02B 25/002 348/832 |
| 7,495,846 | B1 | * | 2/2009 | Kappel | G02B 27/0172 359/802 |

* cited by examiner

*Primary Examiner* — Loha Ben

(57) ABSTRACT

The ScreenScope of the invention is a prescription third focal lens or screen that is used in combination with the prescription for a pair of bifocal glasses worn by a user to read print from a computer monitor screen while gazing comfortably straight ahead wherein the ScreenScope is mounted to and in front of the computer monitor screen.

1 Claim, 1 Drawing Sheet

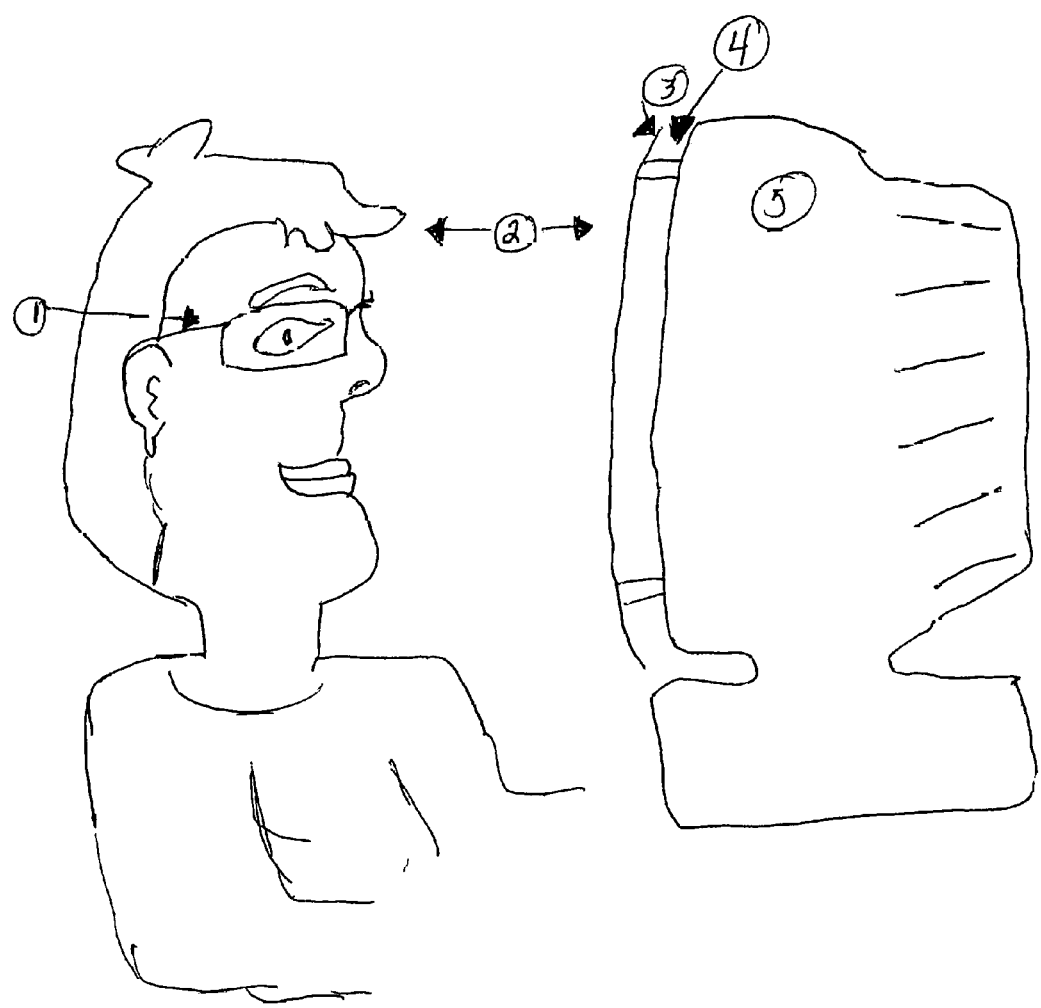

SCREENSCOPE

CROSS REFERENCE TO RELATED APPLICATIONS

Accessories for the computer monitor
Add power lenses eyeglass prescription
Bifocals
Computer accessories
Computer magnifying devices
Computer monitor
Computer screen lens
Computer screen magnification sheet
Computer screen magnifier
Ergonomic
Ergonomic computer lens
Fresnel
Helix magnifying sheet
LCD monitor magnifier
Lens
Magnifying
Magnification films
Magnification panels
Magnification screens
Monitor magnifier
Optical
Optical components
Plastic magnifying sheets
Reading magnifiers
Sheet magnifiers
Trifocals

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention
The ScreenScope is a computer monitor optical lens attachment for people who wear bifocals.
Magnifiers used as ergonomic accessories for the computer monitor screen for those who wear bifocals or otherwise have typically been beset by two problems:
(a) They are offered with only one level of magnification, one-size-fits-all, usually increasing computer screen images and print by a single standard amount, ie, by 1.5 or 2 times.
(b) The attempt to then adjust magnification for individual needs consists of a do-it-yourself, onerous process of the user's having to fumble with the magnifier sheet in order to position its placement distance from the computer monitor screen via a system of moveable hooks/clamps—with questionable results. The distance between the magnifier and the monitor screen is important because the image is affected by the distance of the magnifier from both the viewer and the screen.

(2) Description of Related Art, Including Information Disclosed Under 37 CFR 1.97-1.98

These prior state-of-the-art inventions for adjustable lens/holders with glare screens/filters to use with computer monitors are shown from the 1980s to the present in a number of patents including the following: U.S. Pat. No. 4,577,928 in 1985, U.S. Pat. No. 4,712,870 in 1986, U.S. Pat. No. 4,712,870-A in 1987, US 298250 in 1988, U.S. Pat. No. 4,958,707 in 1990, U.S. Pat. No. 5,048,928 in 1991, up to the Kantek adjustable LCD monitor, U.S. Pat. No. 7,495,846 in 2009.

The ScreenScope offers an improvement of the "one-size-fits-all" and "do-it-yourself" problems of previous monitor magnifiers.

The ScreenScope solves the "one-size-fits-all" problem because the screen magnifier sheet is manufactured to individual needs, using the individual person's trifocal prescription strength.

The ScreenScope solves the "do it yourself" problem because the magnifier's placement distance from the monitor screen is measured and calculated at the optometrist's office. In the same way that a person is fitted for eyeglasses, the measurement of the distance of the ScreenScope from the monitor screen is measured by a trained technician, ensuring professional results.

Classifications:
US—D14/449, D19/448, 359/742, 359/443, 359/738, 359/802, 248/466, 383/408
Cooperative—G02B7/006, G02B7/00

BRIEF SUMMARY OF THE INVENTION

The ScreenScope is an ergonomic computer screen magnifier with anti-reflective coatings for use as an attachment to the computer monitor for people who wear prescription bifocal glasses, whereby images are magnified and enhanced and glare is reduced.

The ScreenScope has at least one polycarbonate lens positioned adjacent to the computer monitor screen for magnification, and also features a laminated filter/coating applied adjacent and parallel to the lens for reducing both external light as well as that reflected from within the computer monitor screen.

This device is made for people who wear bifocal glasses. Bifocal glasses include two prescriptions within one lens, a near-vision "window" ground into the lower center portion of an eyeglass lens for reading, leaving the rest of the lens for distance viewing. Trifocal glasses include a third prescription within the lens, located just above the near-vision window, which corrects for intermediate distances (arm's length) of from approximately 20 to 30 inches or so, which includes the distance for reading from a computer screen. The amount of the magnification of the ScreenScope is determined by the user's trifocal prescription.

The ScreenScope is made individually for each user, according to the person's prescription for trifocal strength. So the manufacture of the ScreenScope would have in common some of the elements for making eyeglasses, including the following: The ScreenScope computer lens would start out as a plastic disc, composed of lightweight optical grade acrylic, polycarbonate construction, or other materials as appropriate and known, to provide optimum image quality, plus fresnel technology that would permit the large-size lens to be much thinner. A scanner would retrieve the prescription from a central computer, then program those measurements into the tray holding the disks. A mixture of metals would then be heated in order to make a metal holder for the lens on a machine for tooling. And then the tray of disks would then arrive to a computer controlled milling machine used to manufacture lenses, where the Rx is read and reshapes the plastic accordingly. The surface of the lens is polished, using abrasive paper under heated water. The metal attachment and protective film are removed. Then the Rx would be checked for accuracy, using a machine called a lensometer.

This Rx for the ScreenScope would equal the trifocal measurement, the intermediate measurement, if the user were wearing trifocal glasses. The intermediate additional lens in trifocal glasses is normally half the reading ("Add Power") addition. So, for someone with a distance prescription of −4 diopters, for example, and a reading addition of +3, the reading portion would equal −1, and the intermediate segment would be −2 to −2.5 diopters. This last intermediate segment would be the Rx for the ScreenScope for the person in this example.

The magnification Rx for the ScreenScope would be the same as the intermediate segment of a trifocal prescription. This intermediate segment provides fifty percent of the added magnifying power of the reading or near segment.

Next the lenses would go through a multi-stage cleaning, then be coated with varnish, and heated until the varnish cures. Then the anti-reflective treatment would be added, adding chemicals (which could include celisium oxide, titanium oxide and zirconium oxide) heated using a high powered electron beam, transforming the powders from solid to gas and coating the lenses in the process. The light filter would have a first element to retard the light generated externally; a second element positioned parallel to and adjacent to vary color of the image projected from the screen; and the third element positioned parallel to and adjacent to the first and second elements to capture light from exiting the filter.

One of the last steps in making the ScreenScope would be to feed the lens through a laminator, sandwiching the screen between two sheets of transparent plastic, using heat and pressure to fuse the layers together. The laminated screen would then be fed into a hydraulic punching machine, which would cut the sheet into the size needed to fit the individual size of the computer screen, resulting in an optical surface of rectangular, square or other appropriate shape, cut to the appropriate size to fit the computer screen in use by the individual.

Another need of a computer screen magnifier is to provide an optical device that is easily mounted onto a standard computer monitor. The ScreenScope could be easily mounted onto a monitor by attachment directly to the screen by transparent adhesive tape or velcro, or by attaching the optical element to the screen via the static electricity created by the screen.

The space between the magnifier and the monitor can vary due to individual Rx, because the size and clarity of the image might be affected by the proximity of the magnifier to both the viewer and the screen. So if more distance is needed between the monitor and the ScreenScope, according to individual need, another option could be to fasten the magnifier to the monitor via molded foam strips that are coated with adhesive backing, made in the thickness required to achieve the proper distance between magnifier and computer screen. The size of the foam backing would be determined at the time the Rx is made for the ScreenScope in the optometrist's office.

The angle of the vertical adjustment for optimal viewing could be done by the user's manually adjusting the vertical angle of the monitor itself. And the distance between the monitor and optical device to the user could also be adjusted manually by the user by simply pushing the monitor forward or backward.

BRIEF DESCRIPTION OF THE DRAWING

FIG. 1 shows the arrangement of the ScreenScope of the present invention, disposed between a pair of bifocal glasses worn by a user and a computer monitor screen.
1. Bifocals worn by the computer user
2. Variable distance between the person and the computer
3. ScreenScope
4. Variable distance between the ScreenScope and the computer monitor screen
5. Computer monitor

DETAILED DESCRIPTION OF THE INVENTION

The word telescope means "far seeing," and consists of two types of lenses positioned at just the right distance to produce a surprising optical effect, that of magnifying distance objects. When the computer screen is the distant object in question—and the user wears bifocal lenses—the ScreenScope is that second lens used in combination with one's bifocal lens to read print from the computer screen while gazing comfortably straight ahead.

The ScreenScope works by fitting directly over the computer monitor screen, much like anti-glare filters and privacy filters and computer monitor panels currently in use, and could be fastened to the monitor from a plastic base, from Velcro, or from molded foam backed with adhesive.

When you read a book, your eyes gaze downward toward the printed page, and that's the way it's always been. Until now, because with the increased use of the computer, most people these days instead gaze straight ahead, not down, to do most of their reading from the computer screen. The bifocal glasses that most people wear have served well the downward gaze to read the printed page for hundreds of years. Bifocal glasses include two prescriptions within one lens, a near-vision "window" ground into the lower center portion of an eyeglass lens for reading, leaving the rest of the lens for distance viewing, for seeing things that are five feet away or more. Trifocal prescription glasses include a third prescription within the lens, located just above the near-vision window, which corrects for intermediate distances (arm's length) of from approximately 20 to 30 inches or so, which includes the distance for reading from a computer screen.

Some people who wear glasses wear trifocals to work with the computer, then switch to bifocals for the rest of their activities. The ScreenScope offers the option of placing the trifocal prescription via the LCD fresnel technology lens screen to offer the same option as trifocals without having the switch glasses.

Ideally, the ScreenScope prescription would be measured for the individual at the optometrist's office when the prescription for eyeglasses is calculated. But the option might also exist wherein customers could choose and purchase the ScreenScope at store displays similar to those which customers currently use to select reading glasses.

What is claimed is:

1. A ScreenScope comprising: at least one polycarbonate third focal lens mounted adjacent to a computer monitor screen for magnification to provide optimum image quality, the polycarbonate third focal lens being used in combination with bifocal glasses, which are configured for far and short distance readings, and worn by a user, wherein a reading of material on the computer monitor screen can be carried out through the top portion of the bifocal glasses, which top portion is for far distance reading, and wherein the space between the third focal lens and the computer monitor screen depends on individual prescription value of the third focal lens.

* * * * *